United States Patent [19]

Cooper et al.

[11] 4,209,278
[45] Jun. 24, 1980

[54] CHASSIS HAVING ARTICULATED FRAME

[75] Inventors: Bob D. Cooper; Richard L. Krivy; Herbert J. Horinek, all of Duncan, Okla.

[73] Assignee: Halliburton Company, Duncan, Okla.

[21] Appl. No.: 972,638

[22] Filed: Dec. 22, 1978

Related U.S. Application Data

[62] Division of Ser. No. 879,535, Feb. 21, 1978, Pat. No. 4,159,180.

[51] Int. Cl.² .............................. B60P 1/16; B60P 1/32
[52] U.S. Cl. .................................... 414/477; 414/480; 414/482
[58] Field of Search ............... 414/477, 478, 479, 480, 414/482, 483

[56] References Cited

U.S. PATENT DOCUMENTS

| 2,588,001 | 3/1952 | Holland | 414/477 |
| 3,430,792 | 3/1969 | Grove et al. | 414/477 |
| 3,826,391 | 7/1974 | Prince | 414/477 |

Primary Examiner—L. J. Paperner
Assistant Examiner—Edmond G. Rishell, Jr.
Attorney, Agent, or Firm—James R. Duzan; John H. Tregoning

[57] ABSTRACT

A land vehicle for use as a blender for the mixing of dry, particulate, and liquid materials comprising a chassis having an articulated frame thereon, the articulated frame including a first translatable portion and a second translatable, rotatable portion rotatably secured to the first translatable portion whereby movement of the articulated frame with respect to the chassis between a first retracted position and a second extended position causes translational movement of the first translatable portion of the articulate frame and translational and rotational movement of the second translatable, rotatable portion of the articulated frame. The land vehicle further comprises an engine mounted upon the first translatable portion of the articulated frame, a blender tub mounted upon the second translatable, rotatable portion of the articulated frame for the mixing of dry, particulate and liquid materials therein, a suction pump mounted upon the second translatable, rotatable portion of the articulated frame for supplying liquid material to the blender tub, and a boost pump mounted upon the second translatable, rotatable portion of the articulated frame for discharging the mixture of the dry, particulate, and liquid materials from the blender tub.

5 Claims, 7 Drawing Figures

CHASSIS HAVING ARTICULATED FRAME

This is a division of application Ser. No. 879,535, filed Feb. 21, 1978, now U.S. Pat. No. 4,159,180.

BACKGROUND OF THE INVENTION

This invention relates to a unique chassis arrangement for a land vehicle. More specifically, to a unique chassis arrangement and equipment arrangement for a ground fed blender truck for use in well fracturing operations.

One common way to increase the production of a well, such as an oil, gas, geothermal, etc. type well, is to fracture the producing zone of the geological formation to allow the formation fluids to flow more freely through the formation into the well. The producing zones of geological formations are usually fractured by pumping fluids into the formation under high pressures. However, if merely a fluid is pumped into the formation during the fracturing operation, upon cessation of the pumping of the fracturing fluid, the naturally occurring geological formation pressures will cause the fractured areas of the formation to close thereby restricing the flow of the formation fluids.

To prevent the geological formation from closing after the fracturing thereof, propping agents, such as sand, walnut shells, glass beads, sintered metals, etc., are forced into the fissures in the formation. Accordingly, the function of a blender truck is to accurately mix the particulate propping agents and additive materials with the fracturing fluid before the injection of the fracturing fluid into the well.

In the past, one type of blender truck has been constructed having the blender tub rigidly mounted on the rear of the truck chassis, having the particulate propping agents supplied to the blender tub by screw type conveyors, having the mixed fracturing fluid removed from the blender tub by a centrifugal or gear pump and having the major components of the blender truck directly driven by the truck engine while the other components of the blender truck are driven hydraulically. A disadvantage results from having all the components being operated by the truck engine in that if it is necessary to slow the blender tub mixing speed, a corresponding drop in hydrualic system pressure and the reaction time of the hydraulic system components occurs thereby making it difficult to accurately control the additive mixing rates in the fracturing fluid. Yet another disadvantage results in the maintenance and repair of the pumps and their associated components due to the inaccessibility of their mounting position and the high frequency of repair of the screw type conveyors due to the erosion thereof by the abrasive materials conveyed thereby.

Typical examples of these prior art blender trucks are shown on page 128 of the Halliburton Services Sales and Service Catalog 1970-71, and page 2942 of the Halliburton Services Sales and Service Catalog Number 38.

SUMMARY OF THE INVENTION

In contrast to these prior art blender trucks, the present invention is directed to a unique chassis arrangement for the mounting of the equipment thereon and a unique equipment arrangement for a ground fed type blender truck for use in well fracturing operations. In elementary terms, the unique chassis arrangement for the mounting of equipment thereon comprises an articulated frame having a first translatable portion connected to a second translatable, rotatable portion. Similarly, the unique equipment arrangement for a ground fed type blender truck comprises a blender tub which requires no conveying means, independently driven blending and hydraulic systems thereby allowing the independent speed control of each, and an arrangement for equipment which allows access to components requiring frequent repair and allows the addition of a power source to independently drive the various components of the blending system thereby allowing the optimization of horsepower requirements for the blending system, the hydraulic system and truck transportation system.

The foregoing advantages of the present invention will be more fully understood in conjunction with the following drawings and description thereof.

DESCRIPTION OF THE PREFERRED EMBODIMENT

Figure 1:
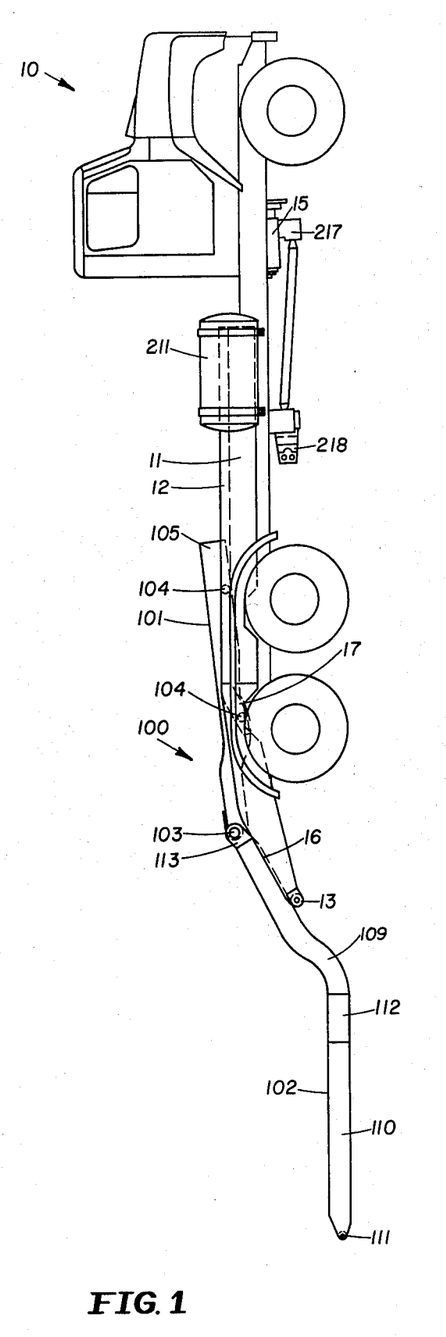
FIG. 1 is a view of the right side of a typical truck chassis with the articulated frame of the present invention thereon in its extended position.

Referring to FIG. 1, the present invention is shown in its preferred embodiment. A truck chassis 10 is shown having an articulated frame 100 mounted thereon.

The articulated frame 100 comprises a first translatable portion 101 and a second translatable, rotatable portion 102 secured to said first translatable portion 101 by a hinge type pin connection 103. The articulated frame 100 is retained on the truck chassis 10 by means of truck chassis members 11 forming a closed track 12 (shown in phantom) having a downwardly angled portion 17 at the rear end thereof in which rollers 104 of the articulated frame 100 are retained. The truck chassis members 11 further have a roller 13 mounted therebetween at one end and an open flanged lip portion 16 to facilitate translation and rotation of the second frame portion 102 with respect to the truck chassis 10.

Figure 2:
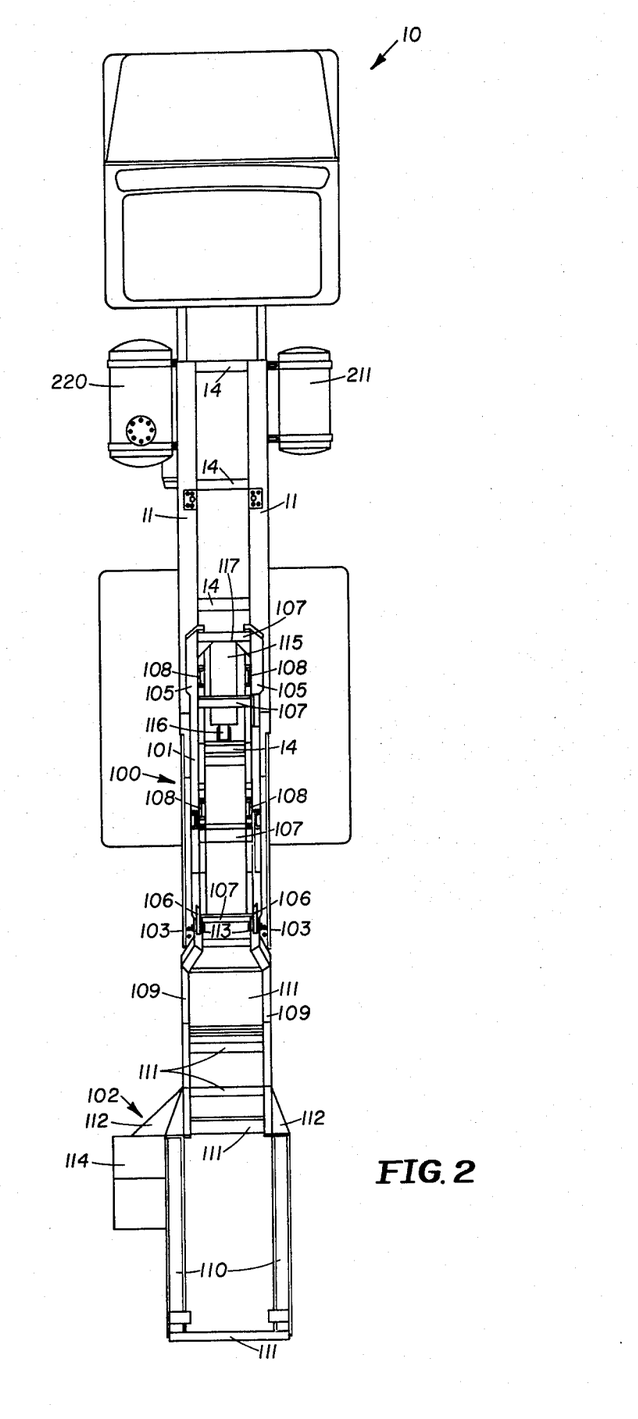
FIG. 2 is a top view of a typical truck chassis with the articulated frame of the present invention thereon in its extended position.

Referring to FIG. 2, the first frame portion 101 comprises side rails 105 having lugs 106 thereon, cross-members 107 and roller mounting brackets 108. The second frame portion 102 comprises curved first side rails 109 having ears 113 which mate with lugs 106 of side rails 105 by means of pins to form the hinge type pin connections 103, second side rails 110, cross-members 111 and reinforcing gussets 112. As further shown, any number of equipment mounting pads 114 may be secured to second frame portion 102 at any position thereon to facilitate the mounting of equipment thereon. Similarly, it should be understood that the number of cross-members utilized to form the frame portions 101 and 102 is merely a matter of choice depending upon the desired strength and rigidity of the frame portions.

To move the articulated frame 100 with respect to the truck chassis 10 a telescopic, double acting, hydraulic cylinder 115 is installed having the end of a rod portion 116 secured to a cross-member 14 of the truck chassis 10 while the end portion 117 of the cylinder housing is secured to a cross-member 107 of the first frame portion 101. The hydraulic cylinder 115 may be secured to the truck chassis and first frame portion 101 by any convenient means such as pin type connections, threaded fasteners, etc.

Referring to both FIG. 1 and 2, it can be easily seen that the curved first side rails 109 are shaped such that they allow the portion of the second frame 102 formed by the members 110, 111 and 112 to lie in the same common plane as the lower most surface of the vehcile wheels. This allows any equipment installed upon the portion of the second frame 102 formed by the members 110, 111 and 112 to be easily accessible for servicing. It should be noted that although the curved first side rails 109 are formed to allow the portion of the second frame 102 defined by the members 110, 111 and 112 to lie in the same plane as the lower most surface of the vehicle wheels and are formed to allow translation and rotation of the second frame 102 about the truck chassis 10 when the articulated frame 100 is moved with respect to the truck chassis 10, the curved first side rails 109 could have a hinged connection therein to allow movement of the portion of the second frame 102 defined by the members 110, 111 and 112 with respect to the curved first side rails 109.

Figure 3:
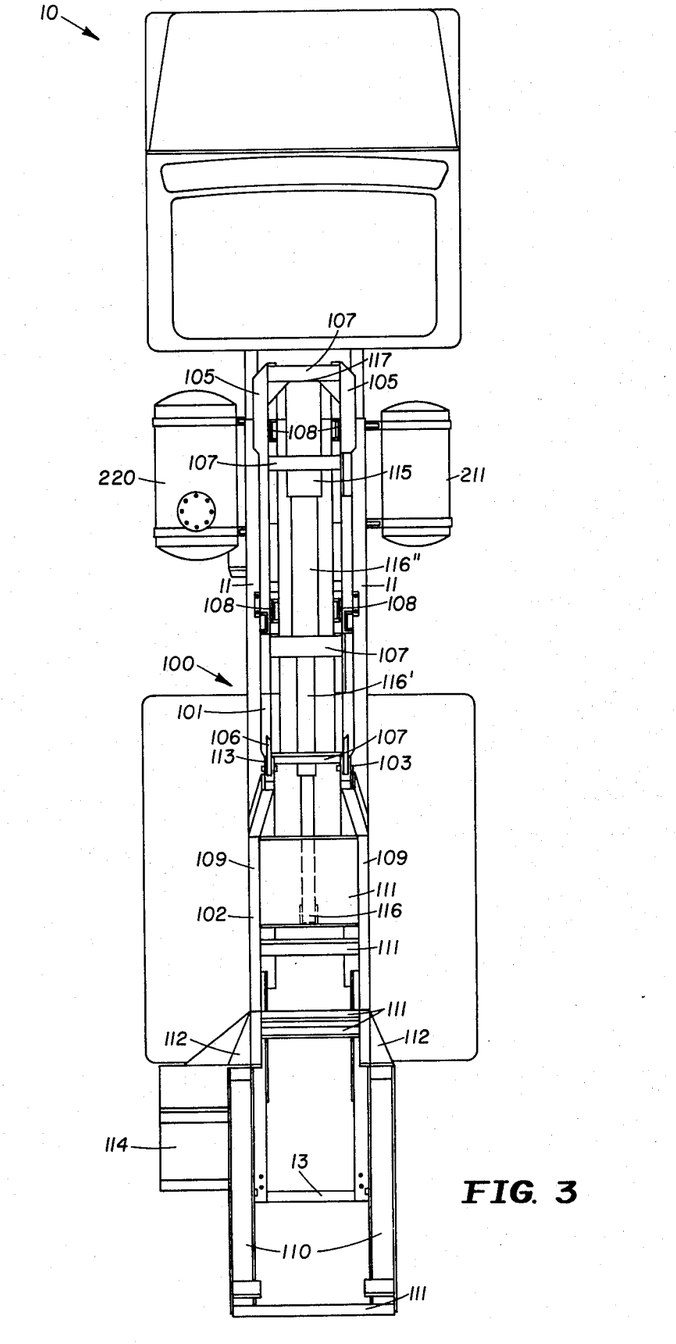
FIG. 3 is a top view of a typical truck chassis with the articulated frame of the present invention thereon in its retracted position.

Referring to FIG. 3, the articulated frame 100 is shown in having the first translatable portion 101 translated to its forward most retracted position on the truck chassis 10 while the second translatable, rotable portion 102 has been translated and rotated with respect to the truck chassis 10 to its forward most retracted position on the truck chassis 10. It can be easily seen that in this position the telescopic, double acting hydraulic cylinder 115 has caused the articulated frame 100 to be moved to its forward most retracted position on the truck chassis 10. In this position, the multiple rod portions 116, 116', 116" of the telescopic, double acting hydraulic cylinder 115 can be seen.

Figure 7:
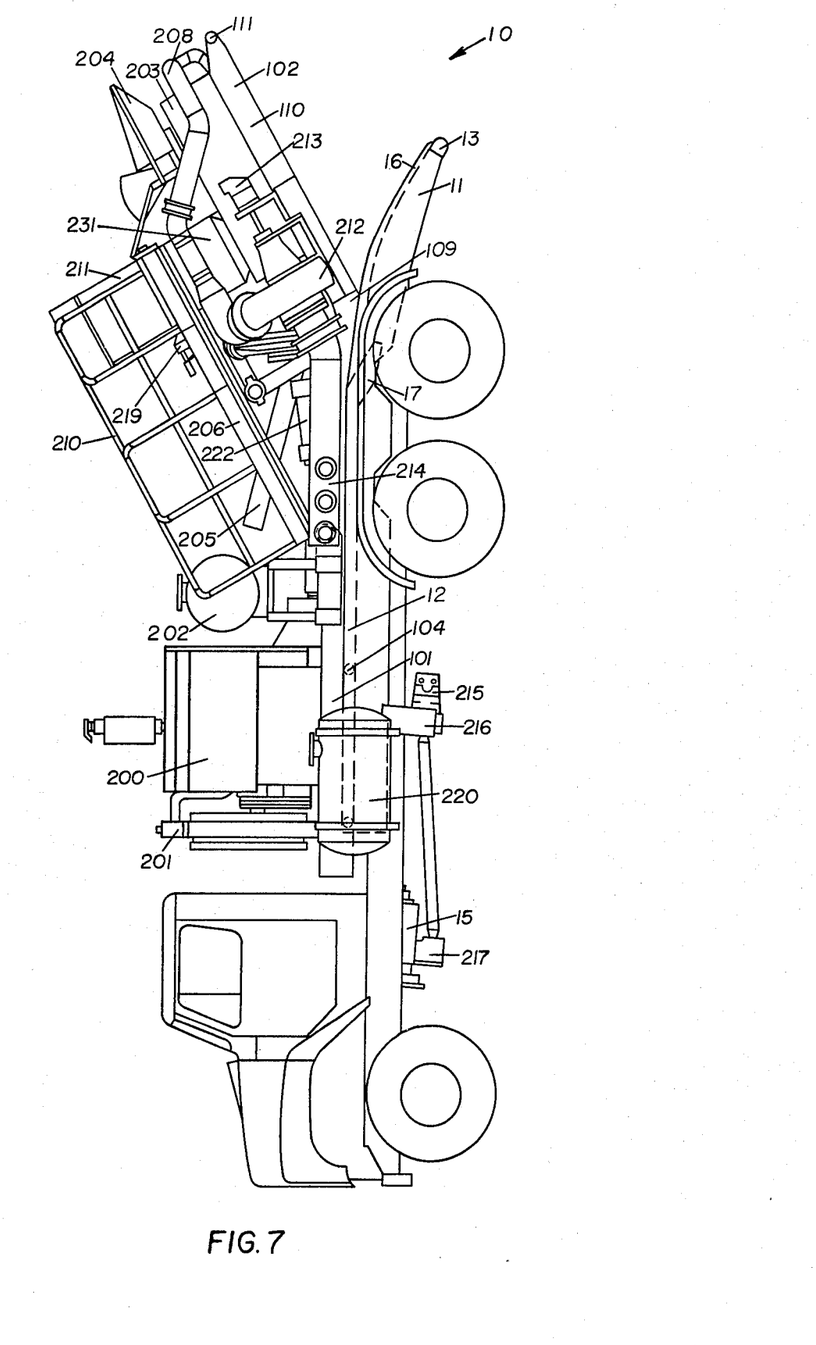
FIG. 7 is a view of the left side of a typical truck chassis with the articulated frame of the present invention having various components mounted thereon in its retracted position.

Although not readily apparent in FIG. 3, but easily seen in FIG. 7, the portion of the second frame 102 formed by the member 110, 111 and 112 is inclined upwardly with respect to the truck chassis 10 thereby disengaging the second translatable, rotatable portion 102 of the articulated frame from the common plane it occupies with the lower surface of the vehicle wheels. In this position, the truck chassis 10 and the articulated frame 100 are easily transported from one location to another.

Although not shown, the cylinder may be connected to any suitable source of hydraulic pressure by any suitable control means to translate the articulated frame 100 on the truck chassis.

Figure 4:
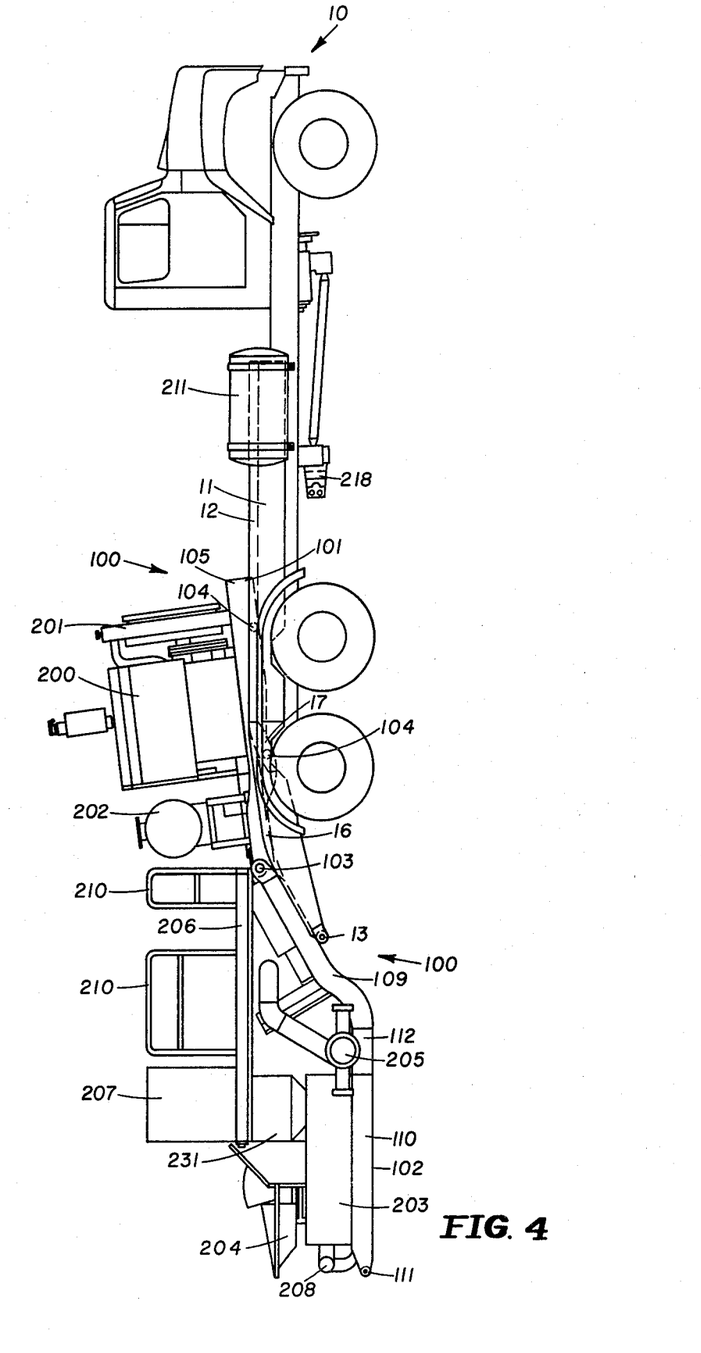
FIG. 4 is a view of the right side of a typical truck chassis with the articulated frame of the present invention having various components mounted thereon in its extended position.

Referring to FIG. 4, a truck chassis 10 having the articulated frame 100 mounted thereon is shown having various equipment installed thereon for use as a blender. As shown, the articulated frame 100 is in its extended position.

The first translatable frame portion 101 is shown having an engine 200, radiator 201 and the liquid additive tank system 202 installed thereon. The second translatable, rotatable frame portion 102 is shown having a blender tub 203, an inlet hopper 204, a discharge manifold 205, an operator platform 206 and operator control stand 207 mounted thereon. The second translatable, rotable frame portion 102 also comprises a manifold 208 which is interconnected with the blender tub 203 to supply various liquid material to the blender tub 203 during the operation thereof.

Although not shown, the blender tub comprises a plurality of screw type agitators running the length thereof and driven by a suitable hydraulic motor, internal spray bars located about the interior of the tub 203 to increase the mixing of the various materials in the blender tub 203 and a discharge pipe. Although the screw type agitators in the blender tub 203 are normally driven by a single hydraulic motor driving through a chain and sprocket arrangement mounted on an exterior end of the blender tub 203, any suitable power source may be used or multiple power sources may be used if so desired.

The inlet hopper 204 simply comprises a funnel type, gravity feed hopper arrangement having one or more graduated sliding valve members (not shown) to control the flow of any material in the inlet hopper 204 into the blender tub 203. Any suitable type metering valve may be used in place of the sliding valve members, if so desired.

The operator platform 206 comprises a grate-like floor which is mounted by any suitable support (not shown for clarity) to provide an unobstructed work area for the operator of the blender truck. The operator platform 206 also includes guard rails 210 to help prevent anyone on the operator platform 206 from falling therefrom.

The control stand 207 contains all the necessary controls for the operation of the blender components and their associated valving mounted on the articulated frame 100. For clarity no attempt has been made to show the various hydraulic lines to the blender components or the various control system lines.

Mounted on the truck chassis members 11 at any suitable location is a fuel tank 211 which is used to supply fuel to the engine 200.

The liquid additive contained within the liquid additive tank system 202 is metered into the blender tub 203 by suitable control valves (not shown) for mixing with the various materials within the blender tub.

Figure 5:
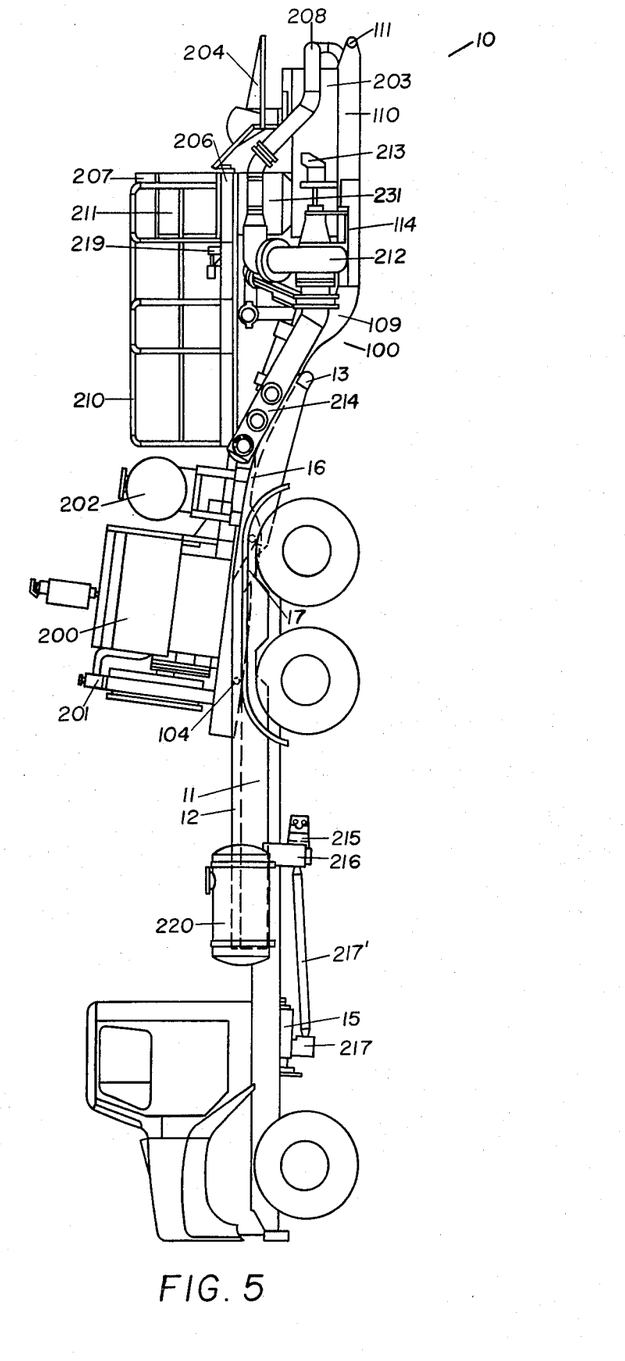
FIG. 5 is a view of the left side of a typical truck chassis with the articulated frame of the present invention having various components mounted thereon in its extended position.

Referring to FIG. 5, the manifold 208 is shown connecting the discharge side of suction centrifugal pump 212 which is mounted on pad 114 of the articulated frame 100 to the blender tub 203. The suction pump 212 may be any suitable type centrifugal pump. The suction centrifugal pump 212 is driven by any suitable type hydraulic motor 213 capable of supplying the necessary motive power to the pump 212. The inlet of the suction centrifugal pump 212 is connected to an inlet manifold 214 which contains a plurality of inlet connections.

To power the hydraulic motor 213 driving the suction centrifugal pump 212, a hydraulic pump 215 is shown which, in turn, is driven by a gear box 216. The gear box 216 is driven via drive shaft 217' and power take-off 217 from the truck chassis transmission 15. The gear box 216 also drives a second hydraulic pump 218 (see FIG. 1) which supplies hydraulic power to the hydraulic motor driving the screw type agitators in the blender tub 203, the hydraulic motor 219 driving the dry additive system 211, and the other various hydraulic control system components. For convenience and clarity the various hydraulic system lines and hydraulic system components have not been shown.

The hydraulic pumps 215 and 218, the gear box 216, and the power take-off 217 may be any suitable type commercially available units. To supply the necessary hydraulic fluid for the various hydraulic systems a tank 220 is mounted at any convenient location on the truck chassis 10.

The dry additive system 211 which is driven by hydraulic motor 219 is also shown in FIG. 5. The dry additive system 211 is any suitable type commercially available unit which is capable of accurately measuring and dispensing dry material on a volume basis to be added and mixed with the other materials in the blender tub 203. To drive the dry additive system 211, any commercially available hydraulic motor 219 or other convenient type power source may be used.

After the dry material is dispensed from the dry additive system 211 but before it enters the blender tub 203, the dry material is mixed with fluid in an eductor system 231. Any commercially available eductor system suitable for this purpose can be used. After mixing with fluid in the eductor system 231, the mixture of dry additive and fluid is injected into the blender tub 203 for further mixing with the materials therein.

Figure 6:
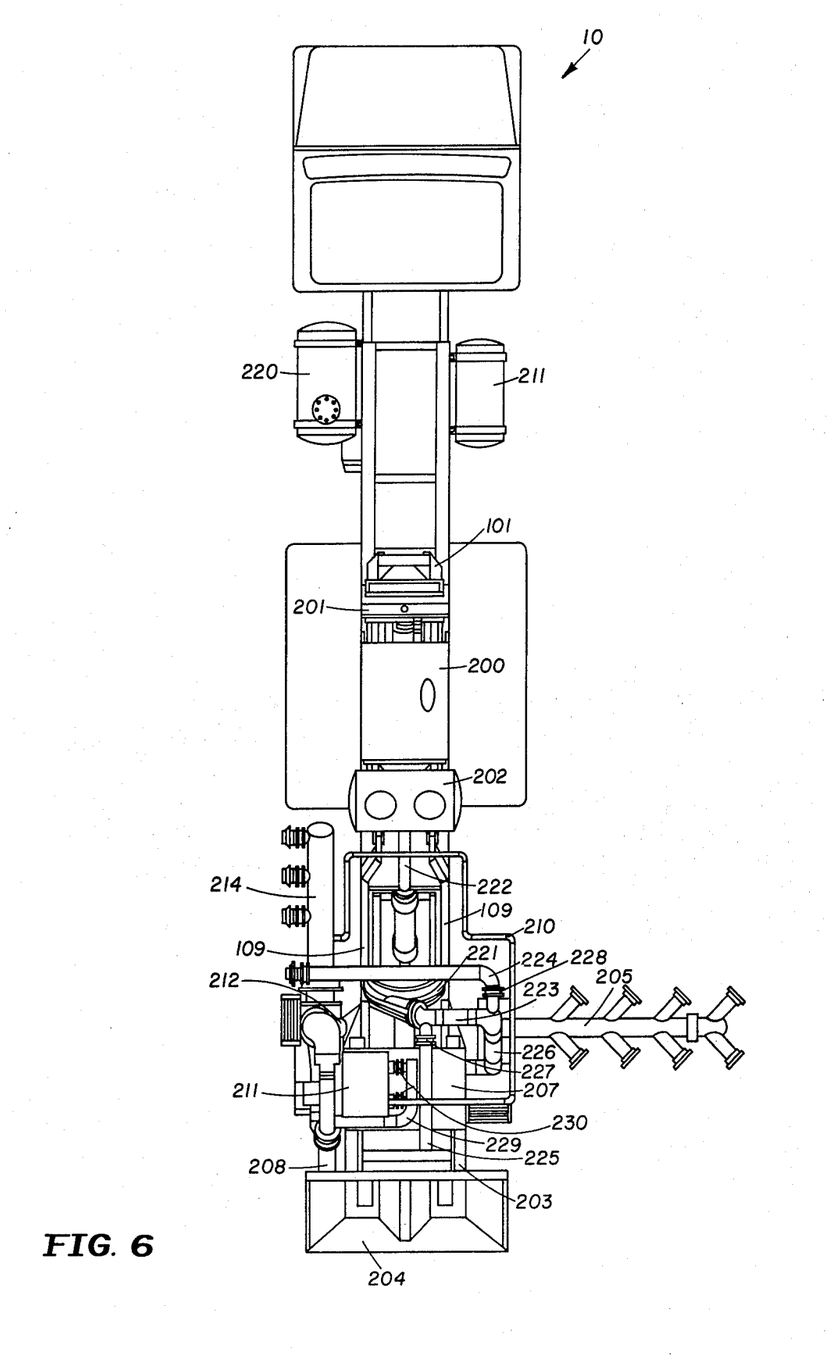
FIG. 6 is a top view of a typical truck chassis with the articulated frame of the present invention having various components mounted thereon in its extended position.

Referring to FIG. 6, the engine 200 directly drives centrifugal boost pump 221 via drive shaft 222. Since the engine 200 and the centrifugal boost pump 221 are not in the same horizontal plane, the drive shaft 222 includes the necessary universal joints to allow coupling of the engine 200 to the centrifugal boost pump 221. Any commercially available engine and centrifugal pump can be used, the only requirement being that the engine and pump combination must be of sufficient size to pump the desired flow rates.

It should be noted that by driving the centrifugal boost pump 221 directly from its own power source it allows independent operational control of the pump 221 from that of the blender tub 203, suction pump 212 and the various hydraulic control system components. Although directly driven by drive shaft 222, the centrifugal boost pump 221 may be driven by a hydraulic motor whose power source would be a hydraulic pump driven by the engine 200. If a hydraulic power system is used to drive centrifugal boost pump 221 the engine 200 could be remounted on the truck chassis 10 thereby allowing other components to be mounted on the first translatable portion 101 of the articulated frame 100.

It should also be noted that by placing the intersection of the engine driveline and drive shaft 222 in the same intersection plane as the hinge type pin connection 103 between the first translatable portion 101 and second translatable, rotatable portion 102, the centrifugal boost pump 221 can be driven when the second translatable, rotatable portion 102 of the aticulated frame 100 is in any position related to the first translatable portion 101.

As shown, the discharge of centrifugal boost pump 221 empties into line 223 which, in turn, empties into lines 224, 225 and discharge manifold inlet line 226. Line 225 and its associated control valve 227 discharges into blender tub 203 to allow recirculation of fluid into the blender tub 203. Line 224 and its associated control valve 228 terminates on the left side of the truck chassis 10 while discharge manifold inlet line 226 connects the discharge of the centrifugal boost pump 221 with the discharge manifold 205. As shown, the discharge manifold 205 contains a plurality of outlets each having its own associated control valve (not shown).

As can also be seen in FIG. 6, manifold 208 contains a branch line 229 and control valves 230 which control the fluid flow to the eductor system 231 for mixing fluid with the dry material from the dry additive system 211 before the injection thereof into the blender tub 203.

It should be noted that for clarity in FIG. 6, the operator platform 206 has been deleted with its associated supports. The guard rail 210 has been shown to illustrate the area occupied by the operator platform 206.

Referring to FIG. 7, the articulated frame 100 is shown in its retracted or transport position with respect to the truck chassis 10.

When the articulated frame 100 is moved to its transport position, the rollers 104 move along track 12 of the truck chassis members 11 thereby allowing movement of the first translatable portion 101 of the articulated frame 100 while the second translatable, rotatable portion 102 of the articulated frame 100 rotates upwardly while translating along roller 113 and open flanged lip portion 16 of the truck chassis members 11. The first side rails 109 roll along roller 13 connected between truck chassis members 11 for a portion of the movement of the articulated frame 100 along the truck chassis 10 until the roller 13 contacts the curved portion of the first side rails 109. When the roller 13 contacts the curved portion of the first side rails 109, the second portion 102 of the articulated frame 100 rotates upwardly as well as simultaneously translating about the truck chassis 10 thereby causing portion 102 of the articulated frame 100 to be disengaged from the common plane of the lower most surface of the truck chassis wheels. Continued movement of the articulated frame 100 along the truck chassis 10 causes the surface of the curved portion of first side rails 109 to slide along an open flanged lip portion 16 in the truck chassis side members 11 until the curved portion of first side rails 109 comes to rest adjacent the rear inclined portion 17 of the truck chassis track 12.

In the transport position, the truck chassis 10 may be easily moved from location to location. To return the articulated frame 100 to its extended position, the telescopic hydraulic cylinder 115 is retracted thereby translating portion 101 and translating and rotating portion 102 of the articulated frame 100 along the truck chassis 10 until the second translating, rotating portion 102 lies in the same horizontal plane as the lower most surface as the truck chassis wheels.

It should be noted that for transportation purposes, the discharge manifold 205 is swiveled into position along side the operator platform 206. This is facilitated by a swivel joint (not shown) in the discharge manifold 205. To retain the manifold in position along side the operator platform 206 any suitable clamp is used.

It should be apparent from the foregoing description and drawings that several advantages result from the arrangement of the various blender components with respect to the articulated frame 100 and the truck chassis 10.

One advantage results when the articulated frame is in its fully extended position by having the blender tub 203 and the centrifugal suction pump 212 and centrifugal boost pumps 221 mounted in close proximity to each other. By mounting the centrifugal boost pump 221 and centrifugal suction pump 212 in close proximity to the blender tub 203 the pumps, particularly the suction pump 212, are kept almost completely flooded with liquid during their operation thereby helping to prevent any loss of prime of the pumps during normal pumping operation.

Another advantage results from the mounting of the centrifugal suction pump 212 along side the blender tub 203 where it is easily accessible for repair and servicing.

Yet another advantage results from the independent operation of the centrifugal boost pump 221 and the other components of the blender system. By having separate power sources for the centrifugal boost pump and other components of the blender system the various component operating speeds and component controls may be more easily controlled as well as permitting the use of two smaller horsepower engines to drive the blender components and truck chassis rather than one large engine.

Still yet another advantage results from having the blender tub 203 mounted such that it may be fed with materials via inlet hopper 204 from normal commercially available land vehicles thereby eliminating the need for screw-type conveyors to convey the materials to the blender tub.

It should be understood that although the various components of the blender have been illustrated having a particular location and orientation with respect to the truck chassis 10 and articulated frame 100, the various components of the blender could be mounted in other locations and orientations with respect to the truck chassis 10 and articulated frame 100. For instance, the blender tub 203 could be mounted transversely with respect to the second translatable, rotatable portion 102 of the articulated frame 100 with the centrifugal suction pump 212 being mounted on the rear of the second translatable, rotatable portion 102 of the articulated frame.

It should also be understood that since the operation of blenders and their various components used to mix the various dry, particulate, and liquid materials used in well operations is well known in the art, the specific operation of each component of the blender and its interrelationship with the other components described hereinbefore is well known and understood by those of ordinary skill in the art and, accordingly, has not been described in detail.

It should be further understood that the truck chassis 10 and articulated frame 100 thereon could be used for a wide variety of purposes other than the mounting of components for blending operations in well fracturing operation. The truck chassis 10 and articulated frame 100 thereon could be used to mount any components thereon where it is desirable to have easy access to certain components during the operation thereof.

While the invention has been described with reference to preferred embodiments, it will be appreciated by those skilled in the art that additions, deletions, modifications and substitutions, or other changes not specifically described herein may be made which fall within the purview of the appended claims.

What is claimed is:

1. A self-propelled land vehicle for use in well servicing operations comprising:
a self-propelled horizontally fixed chassis having an articulated frame secured thereon, said articulated frame including:
a first translatable portion; and
a second translatable, rotatable portion rotatably secured to the first translatable portion to allow downward rotational movement of the second translatable, rotatable portion with respect to the first translatable portion
whereby movement of said articulated frame with respect to said chassis between a first retracted position and a second extended position causes substantially translational movement of the first translatable portion with respect to said chassis and causes translational and rotational movement of the second translatable, rotatable portion with respect to said chassis where the translatable, rotatable portion translates and rotates downwardly from a first position to a second position.

2. The land vehicle of claim 1 wherein the first translatable portion includes rollers which are retained in a pair of tracks located in chassis member means which are part of said chassis to facilitate translation of the first translatable portion along said chassis.

3. The land vehicle of claim 1 wherein said movement of said articulated frame with respect to said chassis is caused by a hydraulic cylinder having one end secured to said chassis and the other end secured to said articulated frame.

4. The land vehicle of claim 3 wherein said hydraulic cylinder comprises a double acting, telescopic hydraulic cylinder.

5. A self-propelled land vehicle for use in well servicing operations comprising:
a self-propelled horizontally fixed chassis having a pair of tracks located in chassis member means which are part of said chassis and an articulated frame thereon, said articulated frame including:
a first translatable portion having a plurality of rollers thereon which are retained in the pair of tracks;
a second translatable, rotatable portion rotatably secured to the first translatable portion to allow downward rotational movement of the second translatable, rotatable portion with respect to the first translatable portion; and
hydraulic cylinder means having one end secured to said chassis while the other end is secured to said articulated frame
whereby movement of said hydraulic cylinder means causes movement of said articulated frame with respect to said chassis between a first retracted position and a second extended position thereby causing substantially translational movement of said first translatable portion with respect to said chassis and causing translational and rotational movement of the second translatable, rotatable portion with respect to said chassis where the translatable, rotatable portion translates and rotates downwardly from a first position to a second position.

* * * * *